United States Patent [19]

Ogawa

[11] Patent Number: 5,119,472
[45] Date of Patent: Jun. 2, 1992

[54] PRINTER CONTROL DEVICE

[75] Inventor: Hiroyuki Ogawa, Kanagawa, Japan

[73] Assignee: Fuji Xerox Co., Ltd., Tokyo, Japan

[21] Appl. No.: 625,039

[22] Filed: Dec. 10, 1990

[51] Int. Cl.⁵ ............................................. G06D 15/00
[52] U.S. Cl. ..................................... 395/111; 395/101;
355/309
[58] Field of Search ................................ 364/518–520,
364/468, 471, 930 M S, 235 M S; 355/308, 309,
313, 321; 346/154, 134; 400/605, 622; 271/9,
256, 258, 262, 263

[56] References Cited

U.S. PATENT DOCUMENTS

| | | | |
|---|---|---|---|
| 4,495,582 | 1/1985 | Dessert | 364/518 |
| 4,757,348 | 7/1988 | Rourke et al. | 355/6 |
| 4,829,468 | 5/1989 | Nonaka et al. | 364/900 |
| 4,887,218 | 12/1989 | Natarajan | 364/402 |
| 4,947,345 | 8/1990 | Paradise et al. | 364/514 |

OTHER PUBLICATIONS

U.S. application Ser. No. 07/560,932, filed Jul. 31, 1990 by Alane H. Rowald et al., "Printing Priorities for an Electronic Printing System", and pending in Group Art Unit 236.

Primary Examiner—Arthur G. Evans
Attorney, Agent, or Firm—Finnegan, Henderson, Farabow, Garrett and Dunner

[57] ABSTRACT

In a printer control device, the number of printing sheets required for processing printing requests are detected, and when it is determined that the required number of printing sheets of a printing request is larger than a predetermined value, the order for printing is changed such that the printing request is processed later. Therefore, the problem is eliminated wherein a relatively short printing request is not processed for an extremely long period of time.

7 Claims, 3 Drawing Sheets

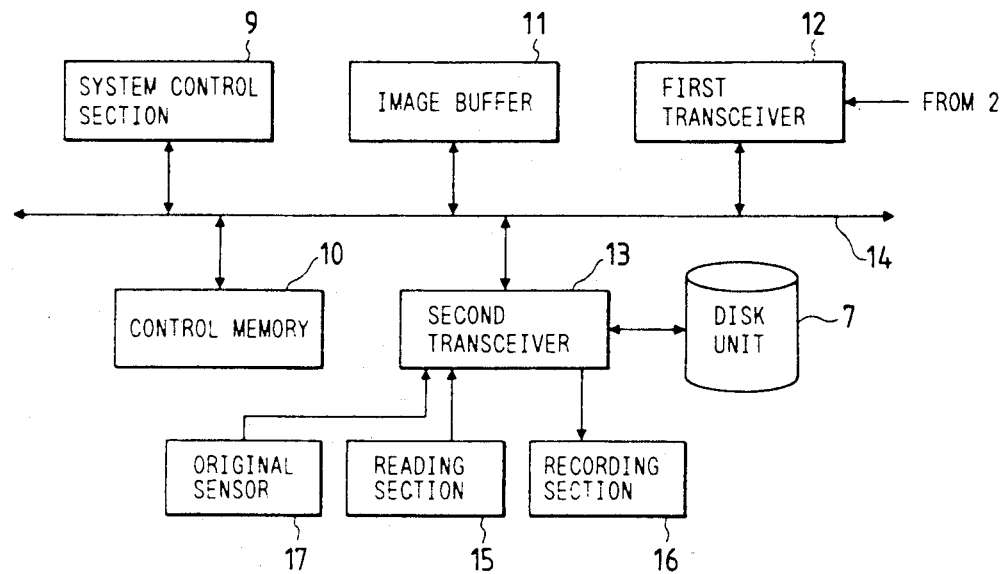

PRINTER CONTROL DEVICE

BACKGROUND OF THE INVENTION

1. Field of the Invention

This invention relates to a printer control device, and more particularly to a printer control device which can handle a plurality of printing requests with high efficiency.

2. Discussion of the Related Art

There is available a printer system in which documents formed with a data processing unit such as a workstation or computer are received through a network, and are temporarily stored, as file data, in a disk device, and the file data thus stored is successively transferred to a data recording section in a printer so as to be printed out. The process of printing document data received through a network is referred to as "an on-line process".

A printer body, having an original document reading section, is capable of copying the original document. The process of printing the image data of an original document read with the original document reading section is referred to as "an off-line process".

In general, the on-line and off-line processes are carried out at random. Therefore, the printer performs those processes in the order that printing requests are received.

The above-described conventional printing technique suffers from the following difficulties:

As was described above, no order of priority is given to printing requests, and the printer deals with the printing requests in the order of receipt.

Accordingly, a printing request may take a long time to be processed. This delay is increased when a printing request for a long document has been received prior to the receipt of a printing request that should have priority, such as a printing request for a relatively short document. In fact, sometimes the waiting time for processing the printing request is much longer than the time it takes to print the document.

When the time for processing a printing request is much longer than the time it takes to print the document, the efficiency of the system is reduced. This problem will adversely affect a number of operators particularly in the case where a plurality of data processing units use a single printer.

SUMMARY OF THE INVENTION

Accordingly, an object of this invention is to eliminate the above-described difficulties accompanying a conventional printing technique.

More specifically, an object of the invention is to provide a printer control device in which the time for processing a printing request is prevented from taking extremely longer than the time for printing the document.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the printer control device of this invention comprises means for storing printing requests, detecting means for detecting the number of printing sheets required for processing the printing requests, means for determining whether the required number of printing sheets of a printing request is greater than a predetermined value, and means for changing a predetermined order for printing by moving the printing requests having a required number of printing sheets greater than the predetermined value to the end of a new order of printing.

With the printer control device of the present invention, a printing request for a document having a length greater than a predetermined value is given a low priority in the order of printing, which eliminates the problem wherein a printing request for a short document is not processed for a long time.

BRIEF DESCRIPTION OF THE DRAWINGS

The nature, principle and utility of the invention will become more apparent from the following detailed description when read in conjunction with the accompanying drawings.

In the accompanying drawings:

FIGS. 2 and 3 are an explanatory diagram and a block diagram, respectively, showing the arrangement of a printer to which the technical concept of the present invention is applied;

FIGS. 4(a) through 4(c) are diagrams showing examples of the status of storage of printing requests.

DETAILED DESCRIPTION OF THE PREFERRED EMBODIMENT

Figure 2:
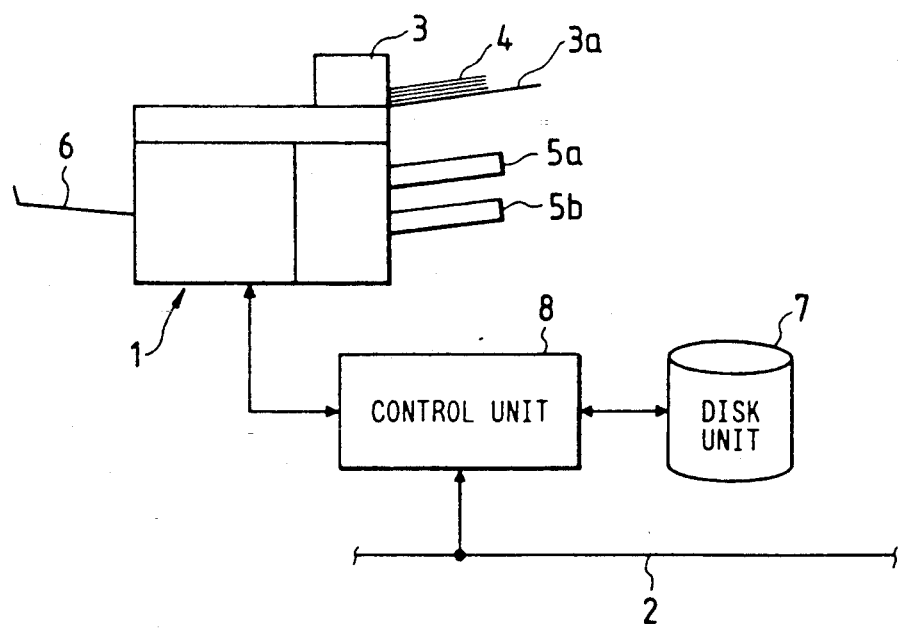

One embodiment of this invention will be described with reference to FIG. 2 showing one example of a printer.

As shown in FIG. 2, a printer body 1 operates to print out either the image data supplied through a network 2 from a plurality of data processing units, or the image data of an original to be copied which is read with a reading section in an automatic document feeder 3.

Recording sheets are separately stacked in sheet supplying trays 5a and 5b according to their size. One of the sheet supplying trays is selected according to a desired recording sheet size, so as to automatically supply the recording sheets into the printer body 1. The recording sheet on which image data has been printed is delivered to a sheet discharging tray 6.

Originals to be copied are stacked on an original tray 3a, and the height of the stack of originals is measured with a potentiometer (not shown). The potentiometer may be either of linear operation type or of rotational operation type. That is, a potentiometer may be employed which changes its resistance with the change in position of an actuator which is provided in contact with the top of the stack of originals, and outputs an electrical signal according to the change in resistance. The output detection signal of the potentiometer (hereinafter referred to as "an original sensor", when applicable) is supplied to a number-of-printing-sheets calculating section (described later) to detect the number of sheets of originals.

A printing request received during the printing process of a piece of image data is stored in a disk unit 7.

The printer thus organized is controlled by a control unit 8, which is designed as shown in FIG. 3.

The control unit 8 has a system bus 14, which is connected to a system control section 9 which includes a CPU, a control memory 10 which includes a ROM and RAM in which data and programs necessary for the operation of the system control section 9 have been stored, an image buffer 11, a first transceiver 12 for controlling the transmission of data to and from the network 2, and a second transceiver 13 for controlling the transmission of data to and from the printer body 1.

The image data stored in the disk unit 7 is bit-map-converted into image data suitable for printing, and the image data is stored in the image memory 11, and transferred to a recording section 16 at a predetermined read speed. Image data read by a reading section 15 in the printer body 1 is transferred to the recording section 16 through the image buffer 11 in response to a print instruction.

The output detection signal of the original sensor 17 provided for the automatic document feeder 3 is supplied, as status data, to the second transceiver 13.

The functions of essential elements in the embodiment will be described with reference to FIG. 1, in which those elements which have been described with reference to FIG. 3 are designated by the same reference numerals or characters.

Figure 1:
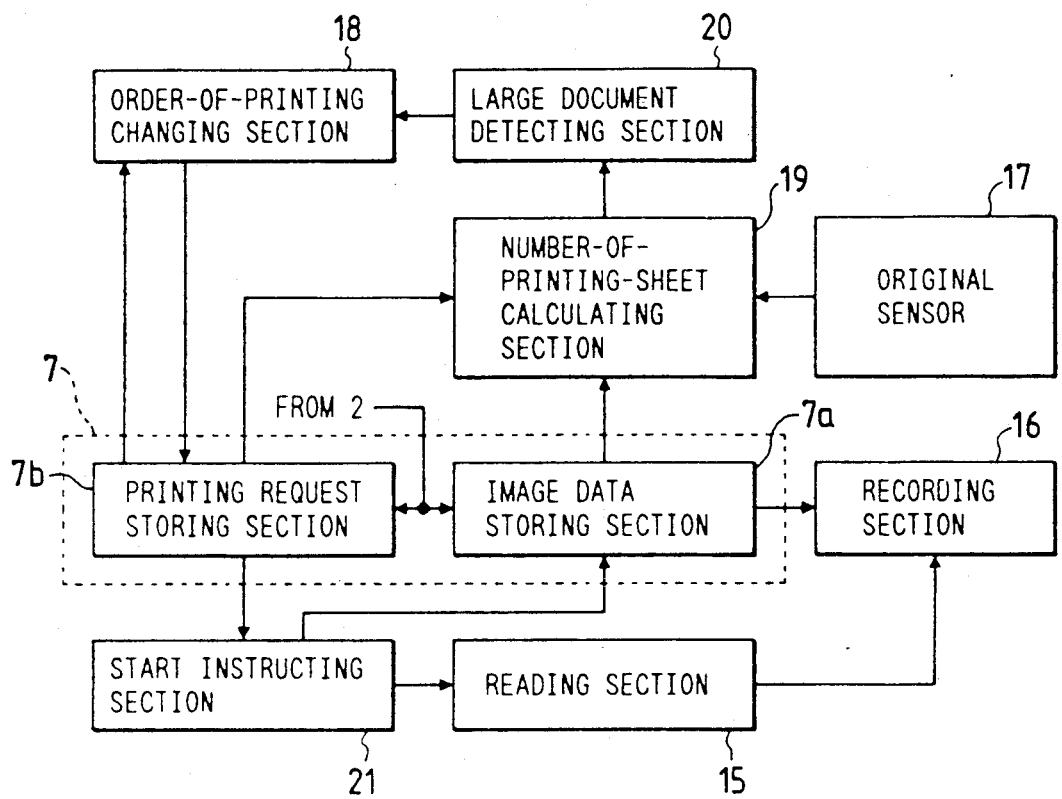
FIG. 1 is a block diagram showing one embodiment of the printer control device according to the present invention.

As shown in FIG. 1, the disk unit 7 includes an image data storing section 7a for storing image data received through the network 2, and a printing request storing section 7b for storing a printing request which is associated with the image data. The printing request is the data necessary for printing the image data stored in the image data storing section 7a, such as the number of copies, the print size and the order for printing of the image data. The number of copies and the print size together with the image data are supplied through the network. The order for printing is fundamentally the order of input, and it may be changed according to an instruction signal provided by an order-of-printing changing section 18 (described later in detail).

The printing request storing section 7b stores not only the printing requests received through the network 1 but also off-line printing requests. An off-line printing request includes data such as the number of copies and the print size as input by the operating section in the printer body 1.

The original sensor 17 supplies a height detection signal of the stack of originals 4 to a number-of-printing-sheets calculating section 19. Upon receiving a printing request, the number-of-printing-sheets calculating section 19 receives the number of document pages from the image data storing section 7a, and the number of copies and the print size from the printing request storing section 7b. At predetermined time intervals, the number-of-printing-sheets calculating section 19 calculates the number of printing sheets for the printing requests received during the time interval, and the printing requests which are received before the time interval which have not yet been printed.

In order to obtain the number of originals to be processed off-line, the number-of-copies calculating section 19 is provided with a function table for obtaining a number of sheets from the detection signal of the original sensor 17.

On the other hand, the image data of a printing request to be processed on-line is converted, page by page, into the bit map of the given print size, whereby the number of document pages is obtained.

Both in the on-line process and in the off-line process, the total number of printing sheets is determined by calculating the product of the number of copies and the number of document pages.

The number-of-printing-sheets data thus detected is applied to a large document detecting section 20, where documents having a length greater than a predetermined value are detected. In the order-of-printing changing section, the order for printing stored in the printing request storing section 7b is changed in accordance with the detection of a large document by the large document detecting section 20. More specifically, the order-of-printing changing section 18 receives the current order for printing from the printing request storing section 7b, and performs a predetermined operation so that a printing request for a large document comes after the other printing requests. This will be described with reference to a flow chart in more detail. The order for printing thus changed is stored in the printing request storing section 7b.

A start instructing section 21 reads the order for printing from the printing request storing section 7b, supplies the corresponding image data from the image data storing section 7a to the recording section 16 and, with the order of printing of an original to be processed on-line, causes the reading section 15 to read the original 4 and send the image data thereof to the recording section 16.

Now, the operation of changing the order for printing will be described.

FIGS. 4(a) through 4(c) show examples of the status of storage of the above-described printing request storing section 7b.

In FIG. 4(a), printing requests A through E are subjected to a change in the order for printing in the order of queue numbers at predetermined time intervals.

In the case where printing requests A through D have been received during a predetermined time interval and, of these printing requests, printing request A represents a document having a length greater than a predetermined value, the printing request A is moved to the end of the order for printing for those printing requests received during the first predetermined time interval; that is, the order for printing is changed as shown in FIG. 4(b).

If during the next predetermined time interval the printing request A has not yet been processed, i.e., the corresponding image data is not printed out yet, the printing requests A through F of the printing requests shown in FIG. 4(c) are subjected to a change in the order for printing. It would appear that printing request A would be moved to the end of the order for printing again. However, a flag is set for those printing requests which have already been moved to the end of the order for printing once. Therefore, for the next predetermined time interval the order for printing remains unchanged.

Figure 5:
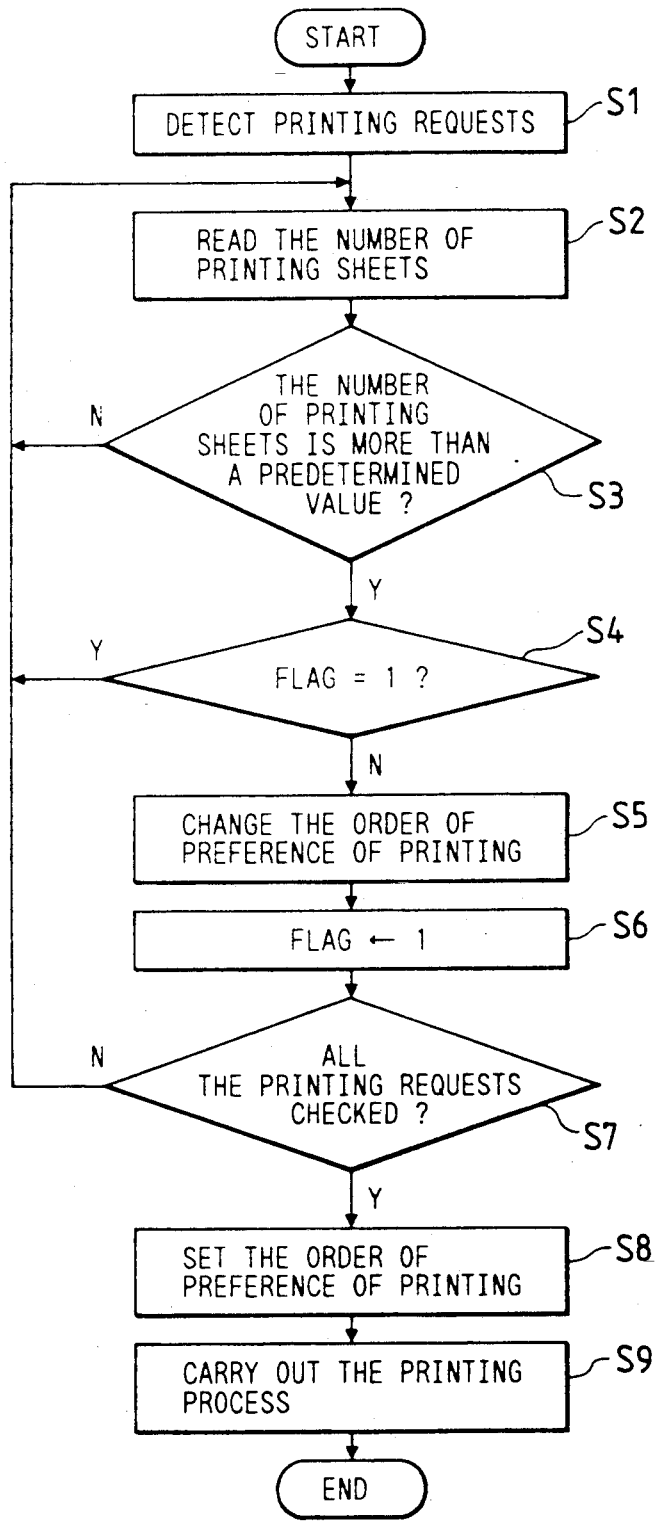
FIG. 5 is a flow chart for the operation of the printer control device according to the present invention.

The operation of the embodiment will be described with reference to the flow chart of FIG. 5.

In Step S1, printing requests to be subjected to a change in the order for printing during the present time interval are detected. That is, what is detected in Step S1 are printing requests which have been received during a predetermined time interval and printing requests which have not been processed yet.

In Step S2, the number of printing sheets for one of the detected printing requests is read from the number-of-printing-sheets calculating section 19 (FIG. 1).

In Step S3, it is determined whether or not the number of printing sheets thus read is greater than a predetermined value, which is for instance fifty (50) pages.

When it is determined that the number of printing sheets to be printed is more than fifty pages, then Step S4 is effected. In Step S4, it is detected whether or not a flag has been set for the printing request. When it is determined that no flag has been set for it, Step S5 is effected. In Step S5, the printing request is moved to the end of the list of those printing requests subjected a change in the order for printing.

On the other hand, if in Step S3 it is determined that the number of printing sheets is less than fifty (50) pages, then Step S2 is effected again, in which the number of printing sheets to be printed for the next printing request is read.

If in Step S4 it is determined that a flag has been set for the printing request, then it is determined that the printing request has already been moved in the order for printing once, and Step S2 is effected again.

A flag is set for the printing request which has been moved in the order for printing in Step S5 (Step S6). The flag thus set means that the printing request should not be moved in the order for printing another time.

In Step S7, it is determined whether or not all printing requests detected in Step S1 have been checked.

When it is determined that all the printing requests have been checked, then Step S8 is effected, in which the order for printing thus changed is stored in the printing request storing section 7b.

In Step S9, the printing process is carried out according to the order for printing as stored.

As is apparent from the above description, in the embodiment a printing request which has a number of printing sheets greater than a predetermined value is moved to the end of the order for printing. Hence, the problem is eliminated wherein a printing request for a short document is not processed for a relatively long time.

In the above-described embodiment, the order for printing is changed for the printing requests which have been received during a predetermined time interval, however, the invention is not limited thereto. For instance, the order for printing may be changed for a predetermined number of printing requests beginning with the first queue-numbered printing request.

Furthermore, in the above-described embodiment, the printing request which has been moved in the order for printing once is no longer moved in the order for printing; however, the invention is not limited thereto. That is, it may be desirable that the printing request which has been moved in the order for printing a predetermined number of times more than once will not be further moved in the order for printing.

In summary, the order for printing is changed in such a manner that a printing request for a large document is processed later than a printing request for a small document.

Furthermore, in the above-described embodiment, the order for printing, the number of copies, and the print size are stored in the printing request storing section 7b, however, the invention is not limited thereto. For instance, for an off-line printing request, the number of copies and the print size may be stored in a memory provided in the printer body 1. In this case, the number of printing sheets is calculated by reading the number of copies from the memory.

As was described above, when the printing requests received includes one for a document having a length greater than a predetermined value, the printing request for the large document is moved to the end of the order for printing so that the printing requests for the smaller documents will be processed sooner.

Accordingly, for a printing request of a smaller document will be processed in a shorter period of time. Thus, the data processing efficiency is much improved.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments, and with various modifications as are suited to the particular use contemplated. It is intended that the scope of the invention be defined by the claims appended hereto, and their equivalents.

What is claimed is:

1. A printer control device having means for reading originals of documents to be printed and which receives printing request to print out corresponding documents in a predetermined order, the length of each document being obtained by converting the heights of originals of document stacked on an original tray into a number of document pages, said device comprising:

means for storing said printing requests;

detecting means for detecting the number of printing sheets required for processing said printing requests;

means for determining whether the required number of printing sheets of a printing request is greater than a predetermined value; and means for changing said predetermined order for printing by moving the printing requests having a required number of printing sheets greater than said predetermined value to the end of new order of priority.

2. The printer control device of claim 1, wherein the stack height of said originals is detected with a potentiometer.

3. The printer control device of claim 1, wherein said detecting means calculates the number of printing sheets required for processing said printing requests by multiplying the number of document pages by the number of copies of said document to be printed.

4. A printer control device which receives printing requests to print out corresponding documents in a predetermined order, comprising:

means for storing said printing request;

detecting means for detecting the number of printing sheets required for processing said printing requests;

means for determining whether the required number of printing sheets of a printing request is greater than a predetermined value; and means for changing said predetermined order for printing requests which are received during a predetermined time interval by moving the printing requests having a required number of printing sheets greater than said predetermined value to the end of a new order for printing.

5. A printer control device which receives printing requests to print out corresponding documents in a predetermined order, comprising:

means for storing said printing requests;

detecting means for detecting the number of printing sheets required for processing said printing requests;

means for determining whether the required number of printing sheets of a printing request is greater than a predetermined value; and means for changing said predetermined order for printing every time a predetermined number of printing requests are received by moving the printing requests having a required number of printing sheets greater than said predetermined value to the end of a new order for printing.

6. A printer control device which receives printing requests to print out corresponding documents in a predetermined order, comprising:

means for storing said printing requests;

detecting means for detecting the number of printing sheets required for processing said printing requests;

means for determining whether the required number of printing sheets of a printing request is greater than a predetermined value;

means for changing said predetermined order of priority by moving the printing requests having a required number of printing sheets greater than said predetermined value to the end of a new order for printing; and flag setting means for preventing a printing request from being moved to the end of said order for printing more than once.

7. A printer control device which receives printing requests to print out corresponding documents in a predetermined order, comprising:

means for storing said printing requests;

detecting means for detecting the number of printing sheets required for processing said printing requests;

means for determining whether the required number of printing sheets of a printing request is greater than a predetermined value;

means for changing said predetermined order of priority by moving the printing requests having a required number of printing sheets greater than said predetermined value to the end of a new order for printing; and flag setting means for preventing a printing request from being moved to the end of the order for printing under at least a predetermined condition.

* * * * *